(12) United States Patent
Yu et al.

(10) Patent No.: US 10,814,709 B2
(45) Date of Patent: Oct. 27, 2020

(54) HORIZONTAL DRIVE ASSEMBLY OF DUAL POWER SOURCE VEHICLE

(71) Applicant: Jing-Jin Electric Technologies Co., Ltd., Beijing (CN)

(72) Inventors: Ping Yu, Beijing (CN); Changqi Yang, Beijing (CN); Jianwen Li, Beijing (CN)

(73) Assignee: Jing-Jin Electric Technologies Co., LTD., Beijing (CN)

( * ) Notice: Subject to any disclaimer, the term of this patent is extended or adjusted under 35 U.S.C. 154(b) by 0 days.

(21) Appl. No.: 16/477,832

(22) PCT Filed: Dec. 12, 2017

(86) PCT No.: PCT/CN2017/115667
§ 371 (c)(1),
(2) Date: Jul. 12, 2019

(87) PCT Pub. No.: WO2018/137421
PCT Pub. Date: Aug. 2, 2018

(65) Prior Publication Data
US 2019/0366822 A1 Dec. 5, 2019

(30) Foreign Application Priority Data
Jan. 24, 2017 (CN) .......................... 2017 1 0059916

(51) Int. Cl.
*B60K 1/02* (2006.01)
*B60K 17/02* (2006.01)
(Continued)

(52) U.S. Cl.
CPC ................ *B60K 1/02* (2013.01); *B60K 17/02* (2013.01); *B60K 17/16* (2013.01); *F16H 3/089* (2013.01);
(Continued)

(58) Field of Classification Search
None
See application file for complete search history.

(56) References Cited

U.S. PATENT DOCUMENTS

| 2003/0078135 A1* | 4/2003 | Yang ........................ | B60K 6/48 477/5 |
| 2006/0111211 A1* | 5/2006 | Kefti-Cherif ............ | B60K 6/42 475/5 |

(Continued)

FOREIGN PATENT DOCUMENTS

| CN | 102490599 A | 6/2012 |
| CN | 204020556 U | 12/2014 |

(Continued)

OTHER PUBLICATIONS

International Search Report dated Mar. 15, 2018 for PCT/CN2017/115667.

(Continued)

*Primary Examiner* — Colby M Hansen
(74) *Attorney, Agent, or Firm* — Fox Rothschild LLP; Carol E. Thorstad-Forsyth

(57) ABSTRACT

A vehicle drive assembly with transverse dual-power-source, comprising two power sources and an automatic transmission (10). The automatic transmission (10) is provided with a first input shaft (21) and a second input shaft (22), and the two power sources are respectively connected to the two input shafts (21, 22); a first intermediate shaft (31), a second intermediate shaft (32) and a second input shaft (22) are provided coaxial with the first input shaft (21); the third intermediate shaft (33) is provided parallel to the first input shaft (21), and a fourth intermediate shaft (34) is provided coaxial with the third intermediate shaft (33); a first gear (11) on the first intermediate shaft (31) and a second gear (12) on the third intermediate shaft (33) are in engaged transmission; a third gear (13) on the second (Continued)

intermediate shaft (32) and a fourth gear (14) on the fourth intermediate shaft (34) are in engaged transmission; and a differential (50) is provided with a fifth gear, the third gear (13) and the fourth gear (14) are in engaged transmission, and the fourth gear (14) is simultaneously in engaged transmission with a fifth gear (15). The drive assembly, in an aspect, has a reduced longitudinal dimension, to be adapted for vehicles of a compact structure, and, in another aspect, uses a small quantity of gears, which simplifies the transmission structure.

14 Claims, 3 Drawing Sheets

(51) Int. Cl.
- *B60K 17/16* (2006.01)
- *F16H 3/089* (2006.01)
- *B60K 6/54* (2007.10)
- *B60K 6/36* (2007.10)
- *B60K 6/38* (2007.10)

(52) U.S. Cl.
CPC ............... *B60K 6/36* (2013.01); *B60K 6/38* (2013.01); *B60K 6/54* (2013.01)

(56) References Cited

U.S. PATENT DOCUMENTS

| | | | | |
|---|---|---|---|---|
| 2012/0004063 A1* | 1/2012 | Koyama | ............... | B60L 7/24 475/5 |
| 2012/0006153 A1 | 1/2012 | Imamura et al. | | |
| 2014/0296013 A1* | 10/2014 | Hata | ............... | B60K 6/387 475/5 |
| 2015/0080162 A1* | 3/2015 | Motoyama | ............ | B60K 6/442 475/5 |
| 2015/0105203 A1* | 4/2015 | Kim | ............... | B60K 6/547 475/5 |
| 2015/0211616 A1 | 7/2015 | Yang et al. | | |
| 2017/0008510 A1 | 1/2017 | Imamura et al. | | |

FOREIGN PATENT DOCUMENTS

| | | |
|---|---|---|
| CN | 104290587 A | 1/2015 |
| CN | 104595450 A | 5/2015 |
| CN | 204367890 U | 6/2015 |
| CN | 106523629 A | 3/2017 |
| CN | 106627078 A | 5/2017 |
| CN | 106740024 A | 5/2017 |
| CN | 106882041 A | 6/2017 |
| CN | 206280446 U | 6/2017 |
| CN | 206678782 U | 11/2017 |
| CN | 207140769 U | 3/2018 |
| EP | 3020588 A2 | 5/2016 |
| JP | 10291421 A | 11/1998 |
| JP | 2011033077 A | 2/2011 |

OTHER PUBLICATIONS

Supplementary European Search Report issued in European Patent Application No. 178942215 dated Oct. 30, 2019.

Office Action issued by the European Patent Office dated Jan. 3, 2020 in European Patent Application No. 17894221.5.

Office Action issued in Japanese Patent application No. 2019-539204 dated Jul. 7, 2020.

* cited by examiner

HORIZONTAL DRIVE ASSEMBLY OF DUAL POWER SOURCE VEHICLE

CROSS-REFERENCE TO RELATED APPLICATIONS

The present application is the U.S. National Phase of International Patent Application No. PCT/CN2017/115667, filed on Dec. 12, 2017 and entitled "HORIZONTAL DRIVE ASSEMBLY OF DUAL POWER SOURCE VEHICLE," which claims priority to Chinese Patent Application No. CN 201710059916.8, filed on Jan. 24, 2017 and entitled "HORIZONTAL DRIVE ASSEMBLY OF DUAL POWER SOURCE VEHICLE", the contents of which are incorporated herein by reference in their entireties.

TECHNICAL FIELD

The present disclosure relates to a vehicle drive assembly with transverse dual power source, connected to a front axle or rear axle of a vehicle, for driving the vehicle.

BACKGROUND

In current purely electrical driven or hybrid power new energy automobiles, the dynamic characteristics of the employed electric motors deviate from the requirements of the entire vehicle, and cannot satisfy the requirements of speed ratio and moment. Because new energy automobiles are required to face increasingly complicated working conditions and road conditions, and the users are having increasingly higher requirements on the comfort degree and the endurance mileage of new energy automobiles, the new energy automobiles of simple electric motor directly driving mode, electric-motor-connected-to-speed-reducer mode or oil-electricity hybrid power mode cannot satisfy the demands on the development of the new energy automobile industry.

In the current vehicle power assemblies, the power source, the clutch, the gearbox or speed reducer, and the driving shaft are generally longitudinally arranged, which has a larger length and occupies a larger vehicle room, and is not applicable to some miniature vehicles that require a compact structure.

Furthermore, in current purely electrical driven or hybrid power new energy automobiles, speed reducers cannot use conventional friction clutches because the shock of the rotor shaft of the electric motor is large (the rotor shaft and the input shaft are not integrated), and the used clutch can only be in the way of hard connection, and does not possess cushioning effect, which cannot satisfy the requirements of new energy automobiles.

In the existing automobiles of the electric motor directly driving mode, the power system does not have clutch function, the conventional inertia friction synchronizers cannot be used, and the transmission cannot shift gears and can only use a single speed ratio. The startup and stopping of the entire vehicle can only rely on the startup and stopping of the electric motor, which affects the performance of the electric motor.

SUMMARY

Aiming at the above problems of the prior art, the present disclosure provides a vehicle drive assembly with transverse dual-power-source, to solve the problem of single speed ratio transmission of the existing power assemblies, which cannot be adapted for complicated road conditions and working conditions.

Additionally, the present disclosure is to solve the problems of the existing power assemblies that the longitudinal dimension is larger, which cannot be used in vehicles of a compact structure, and that the quantity of the gears in the transmission is larger and thus the transmission structure is complicated.

To achieve the above objects, the technical solutions of the present disclosure are realized as follows:

The present disclosure provides a vehicle drive assembly with transverse dual-power-source, connected to a vehicle axle half shaft, wherein the vehicle drive assembly comprises a first power source, a second power source and an automatic transmission, the automatic transmission is provided with a first input shaft and a second input shaft, the power sources are respectively connected to the two input shafts, and a differential is provided at a connection between the automatic transmission and the vehicle axle half shaft;

in the automatic transmission, a first intermediate shaft is provided coaxial with the first input shaft, and a second intermediate shaft is provided coaxial with the first intermediate shaft; the second input shaft is provided coaxial with the second intermediate shaft;

a third intermediate shaft is provided parallel to the first input shaft, and a fourth intermediate shaft is provided coaxial with the third intermediate shaft;

a first clutch is provided between the third intermediate shaft and the fourth intermediate shaft, and a second clutch is provided between the first intermediate shaft and the second intermediate shaft;

the first intermediate shaft is provided with a first gear, the third intermediate shaft is provided with a second gear, and the first gear and the second gear are in engaged transmission;

the second intermediate shaft is provided with a third gear, the second intermediate shaft is provided with a fourth gear, and the third gear and the fourth gear are in engaged transmission; and the differential is provided with a fifth gear, the third gear and the fourth gear are in engaged transmission, and the fourth gear is simultaneously in engaged transmission with the fifth gear.

Optionally, an engaged transmission ratio of the first gear to the second gear is i1, an engaged transmission ratio of the third gear to the fourth gear is i2, and an engaged transmission ratio of the fourth gear to the fifth gear is i3;

when the first clutch is engaged and the second clutch is disengaged, the first power source transmits power to the vehicle axle half shaft via sequentially the first input shaft, the first intermediate shaft, the first gear, the second gear, the third intermediate shaft, the first clutch, the fourth intermediate shaft, the fourth gear, the fifth gear and the differential; and in the automatic transmission the third gear, the fourth gear and the fifth gear are in engaged transmission, with a transmission ratio of i4.

Optionally, when the second clutch is engaged and the first clutch is disengaged, the first power source transmits power to the vehicle axle half shaft via sequentially the first input shaft, the first intermediate shaft, the second clutch, the second intermediate shaft, the third gear, the fourth gear, the fifth gear and the differential; and in the automatic transmission the third gear, the fourth gear and the fifth gear are in engaged transmission, with a transmission ratio of i4.

Optionally, when both of the first clutch and the second clutch are disengaged, the second power source transmits power to the vehicle axle half shaft via sequentially the second input shaft, the second intermediate shaft, the third gear, the fourth gear, the fifth gear and the differential; and an engaged transmission ratio in the automatic transmission is i1×i3.

Optionally, the fourth intermediate shaft is further provided with a sixth gear; the sixth gear is in engaged transmission with the third gear on the second intermediate shaft; and the fourth gear is merely in engaged transmission with the fifth gear.

Optionally, an engaged transmission ratio of the first gear to the second gear is i1, an engaged transmission ratio of the third gear to the fourth gear is i2, and an engaged transmission ratio of the fourth gear to the fifth gear is i3; and an engaged transmission ratio of the third gear to the sixth gear is i5;

when the first clutch is engaged and the second clutch is disengaged, an engaged transmission ratio in the automatic transmission is i1×i3;

when the first clutch is disengaged and the second clutch is engaged, the first power source outputs power via the automatic transmission with an engaged transmission ratio of i5×i3; and when both of the first clutch and the second clutch are disengaged, the second power source outputs power via the automatic transmission with an engaged transmission ratio of i5×i3.

Optionally, the first power source is an electric motor or a combination of an engine and an ISG motor, and a torsion damper is provided between the engine and the ISG motor; and the second power source is an electric motor.

Optionally, the second input shaft and the second intermediate shaft are integrated;

or, a third clutch is provided between the second input shaft and the second intermediate shaft.

Optionally, the first input shaft and the first intermediate shaft are integrated;

or, a fourth clutch is provided between the first input shaft and the first intermediate shaft.

Optionally, the vehicle axle half shaft is a front axle half shaft or a rear axle half shaft; and the first clutch, the second clutch, the third clutch and the fourth clutch each are a contrate tooth clutch.

The present disclosure, by employing the above structure configurations, has the following advantages:

The vehicle power assembly of the present disclosure is connected to the rear axle half shaft or the front axle half shaft of the vehicle. The vehicle power assembly can realize dual power source input and transmission of three speed ratios, and the transmission modes and the power input modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle. Furthermore, when the vehicle is starting, the first power source and the second power source are simultaneously started up, and the total driving force of the drive assembly can be increased, to shorten the acceleration process of the vehicle, to more quickly reach high-speed travelling.

The design mode of the torsion damper in combination with the contrate tooth clutches can minimize the kinetic energy loss, which overcomes the defect of too short service lives of traditional friction clutches because they cannot withstand the dynamic shock of the electric motor.

The vehicle drive assembly with transverse dual-power-source that is provided by the present disclosure, in an aspect, has a reduced longitudinal dimension, to be adapted for vehicles of a compact structure, and, in another aspect, because a small quantity of gears are used, has a simplified transmission structure.

Figure 1:
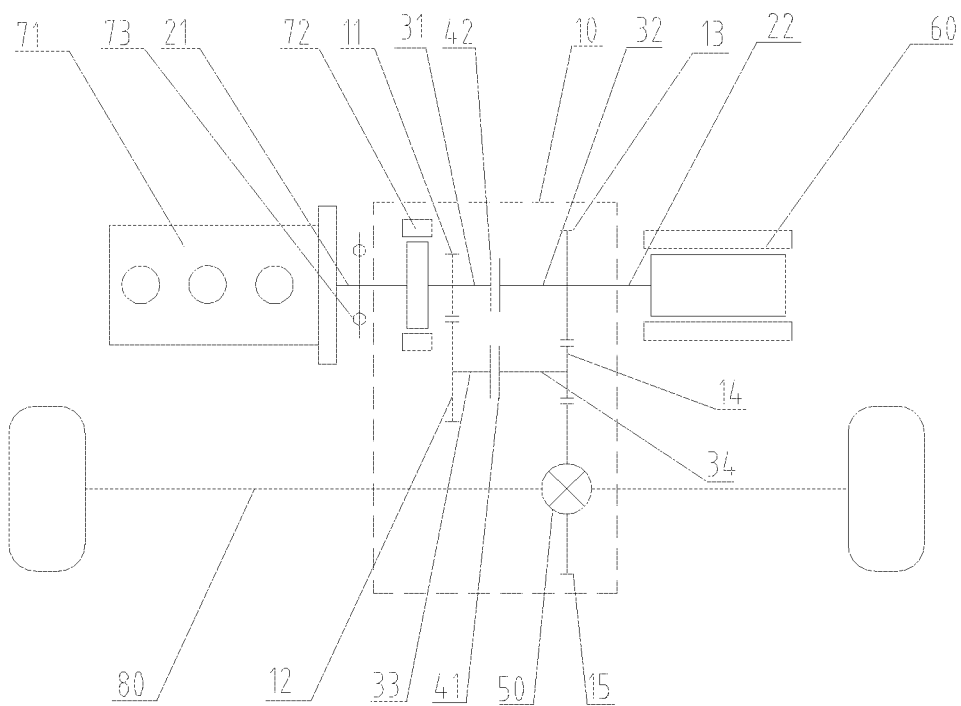
FIG. 1 is a schematic structural diagram of the vehicle drive assembly with transverse dual-power-source of the first embodiment of the present disclosure.

In the drawings: 10. automatic transmission; 11. first gear; 12. second gear; 13. third gear; 14. fourth gear; 15. fifth gear; 16. sixth gear;

21. first input shaft; 22. second input shaft;

31. first intermediate shaft; 32. second intermediate shaft; 33. third intermediate shaft; 34. fourth intermediate shaft;

41. first clutch; 42. second clutch; 43. third clutch; 44. fourth clutch;

50. differential;

60. electric motor;

71. engine; 72. ISG motor; 73. torsion damper;

80. vehicle axle.

DETAILED DESCRIPTION

In order to make the objects, the technical solutions and the advantages of the present disclosure clearer, the embodiments of the present disclosure will be described below in further detail in conjunction with the drawings.

The First Embodiment

The first embodiment of the present disclosure provides a vehicle drive assembly with transverse dual-power-source, connected to a vehicle axle half shaft. As shown in FIG. 1, the vehicle drive assembly comprises a first power source, a second power source and an automatic transmission, the automatic transmission is provided with a first input shaft 21 and a second input shaft 22, and the power sources are respectively connected to the two input shafts, the first power source is connected to the first input shaft 21, and the second power source is connected to the second input shaft 22; and a differential is provided at a connection between the automatic transmission and the vehicle axle half shaft;

in the automatic transmission, a first intermediate shaft 31 is provided coaxial with the first input shaft 21, and a second intermediate shaft 32 is provided coaxial with the first intermediate shaft 31;

the second input shaft 22 is provided coaxial with the second intermediate shaft 32;

a third intermediate shaft 33 is provided parallel to the first input shaft 21, and a fourth intermediate shaft 34 is provided coaxial with the third intermediate shaft 33;

a first clutch 41 is provided between the third intermediate shaft 33 and the fourth intermediate shaft 34, and a second clutch 42 is provided between the first intermediate shaft 31 and the second intermediate shaft 32;

the first intermediate shaft 31 is provided with a first gear 11, the third intermediate shaft 33 is provided with a second gear 12, and the first gear 11 and the second gear 12 are in engaged transmission; and the second intermediate shaft 32 is provided with a third gear 13, the second intermediate shaft 32 is provided with a fourth gear 14, and the third gear 13 and the fourth gear 14 are in engaged transmission; and the differential is provided with a fifth gear 15, the third gear 13 and the fourth gear 14 are in engaged transmission, and the fourth gear 14 is simultaneously in engaged transmission with the fifth gear 15.

In the first embodiment of the present disclosure, the first input shaft 21 and the first intermediate shaft 31 are integrated, and the second input shaft 22 and the second intermediate shaft 32 are also integrated. Certainly, the first input shaft 21 and the first intermediate shaft 31 may also be configured as two independent shafts, between which a clutch may be added, and similarly, the second input shaft 22 and the second intermediate shaft 32 may also be configured as two independent shafts, between which a clutch may also be added.

In the first embodiment, the first power source is the combination of an engine 71 and an ISG motor 72, and a torsion damper is provided between the engine 71 and the ISG motor 72. In an aspect, the idle loss and pollution of the engine are reduced, and in another aspect the ISG motor 72 serves as an electric generator, and can regeneratively generate electricity and recover energy, to save energy. The second power source is an electric motor.

Accordingly, it can be known that, the automatic transmission of the vehicle drive assembly of the first embodiment of the present disclosure is different from the traditional transmissions with layout mode of the input shaft, the intermediate shaft and the output shaft, which, in an aspect, has a reduced longitudinal dimension of the drive assembly, to be adapted for vehicles of a compact structure, and, in another aspect, because a small quantity of gears are used, simplifies the transmission process, and improves the efficiency.

The power transmission process of the drive assembly is particularly as follows:

The engaged transmission ratio of the first gear 11 to the second gear 12 is set to i1, the engaged transmission ratio of the third gear 13 to the fourth gear 14 is set to i2, and the engaged transmission ratio of the fourth gear 14 to the fifth gear 15 is set to i3; and when the first clutch 41 is engaged and the second clutch 42 is disengaged, the first power source transmits power to the vehicle axle half shaft via sequentially the first input shaft 21, the first intermediate shaft 31, the first gear 11, the second gear 12, the third intermediate shaft 33, the first clutch 41, the fourth intermediate shaft 34, the fourth gear 14, the fifth gear 15 and the differential; and an engaged transmission ratio in the automatic transmission is i1×i3. That is the first working condition.

When the second clutch 42 is engaged and the first clutch 41 is disengaged, the first power source transmits power to the vehicle axle half shaft via sequentially the first input shaft 21, the first intermediate shaft 31, the second clutch 42, the second intermediate shaft 32, the third gear 13, the fourth gear 14, the fifth gear 15 and the differential; and in the automatic transmission 10 the third gear 13, the fourth gear 14 and the fifth gear 15 are in engaged transmission with a transmission ratio of i4, and the fourth gear 14 is an idle gear. That is the second working condition.

When both of the first clutch 41 and the second clutch 42 are disengaged, the second power source transmits power to the vehicle axle half shaft via sequentially the second input shaft 22, the second intermediate shaft 32, the third gear 13, the fourth gear 14, the fifth gear 15 and the differential; and in the automatic transmission 10 the third gear 13, the fourth gear 14 and the fifth gear 15 are in engaged transmission with a transmission ratio of i4, and the fourth gear 14 is an idle gear. That is the third working condition.

In the third working condition, the first power source may serve as an auxiliary power source, to engage the first clutch 41 or the second clutch 42, and at this point a larger driving force can be provided in the third working condition.

Further, in the third working condition, the first power source is started up, the power of the first power source cannot be transmitted to the vehicle axle half shaft, merely the ISG motor 72 serves as an electric generator, and can regeneratively generate electricity, and the electric power is stored to a battery or is used to operate the second power source 60.

In that, the magnitudes of the transmission ratios i1, i2 and i3 may be changed by changing the sizes or tooth numbers of the gears, thereby changing the transmission ratio of the automatic transmission 10.

Accordingly, it can be known that, the drive assembly of the embodiment of the present disclosure can realize three transmission ratios:

When the first power source is started up, the first clutch 41 is engaged and the second clutch 42 is disengaged, the engaged transmission ratio in the automatic transmission 10 is i1×i3. At this point, the second power source 60 may be started up or shut down. When the second power source 60 is started up, the total driving force of the drive assembly can be increased, and when the vehicle is starting, the acceleration process of the vehicle can be shortened, to more quickly reach high-speed travelling.

When the first power source is started up, the second clutch 42 is engaged and the first clutch 41 is disengaged, the engaged transmission ratio in the automatic transmission 10 is i2×i3. At this point, the second power source 60 may be started up or shut down. Similarly, when the second power source is started up, the total driving force of the drive assembly can be increased.

When the second power source is started up and both of the first clutch 41 and the second clutch 42 are disengaged, the engaged transmission ratio in the automatic transmission 10 is i1×i3. At this point, the first power source may be started up or shut down. When the first power source is started up, the power of the first power source cannot be transmitted to the vehicle axle half shaft, merely the ISG motor 72 serves as an electric generator, and can regeneratively generate electricity, and the electric power is stored to a battery or is used to operate the second power source.

It can be known from the above that, the vehicle drive assembly can realize dual power source input and transmission of three speed ratios, and the transmission modes are flexible, which satisfies the demands of the entire vehicle on travelling on different road conditions. When the vehicle is climbing a slope with a weight burden, it can select the dual power input and the larger speed ratio transmission, to increase the driving force of the entire vehicle and overcome the defect of the deficient driving force of the entire vehicle. When the entire vehicle is in the cruising condition, it can select the single power input and the smaller speed ratio transmission, to satisfy the requirement by the entire vehicle on high-speed travelling, save energy, and increase the endurance mileage of the vehicle. Furthermore, when the vehicle is starting, the first power source and the second power source are simultaneously started up, and the total driving force of the drive assembly can be increased, to shorten the acceleration process of the vehicle, to more quickly reach high-speed travelling.

In the embodiment of the present disclosure, the vehicle axle half shaft is a front axle half shaft or a rear axle half shaft; and when the vehicle drive assembly is connected to the front axle half shaft, the vehicle is in a front driving mode, and when the vehicle drive assembly is connected to the rear axle half shaft, the vehicle is in a rear driving mode.

The first clutch 41 and the second clutch 42 each are a contrate tooth clutch, comprising a movable fluted disc and a fixed fluted disc that perform engaged transmission. The movable fluted disc is provided with end face transmission teeth or tooth spaces, and the fixed fluted disc is correspondingly provided with end face tooth spaces or transmission teeth. The contrate tooth clutches, compared with friction clutches, can reduce kinetic energy loss to the largest extent, which overcomes the defect of too short service lives of traditional friction clutches because they cannot withstand the dynamic shock of the electric motor.

The drive manner of the contrate tooth clutches may be of the electromagnetically drive type (driven by electromagnet attraction), or the hydraulically drive type (driven by a hydraulic mechanism), or the pneumatically drive type (driven by a pneumatic mechanism), or the electrically drive type (driven by an electric motor), to drive the movable fluted disc to axially move to engage with the fixed fluted disc.

In the case that the first clutch 41 and the second clutch 42 are electromagnetic jaw clutches, when the vehicle drive assembly performs power input, the electromagnetic jaw clutches can enable the power and the entire vehicle to be disengaged and engaged instantly at any moment, which realizes the smooth switch of the power and increases the travelling stability of the vehicle.

The Second Embodiment

Figure 2:
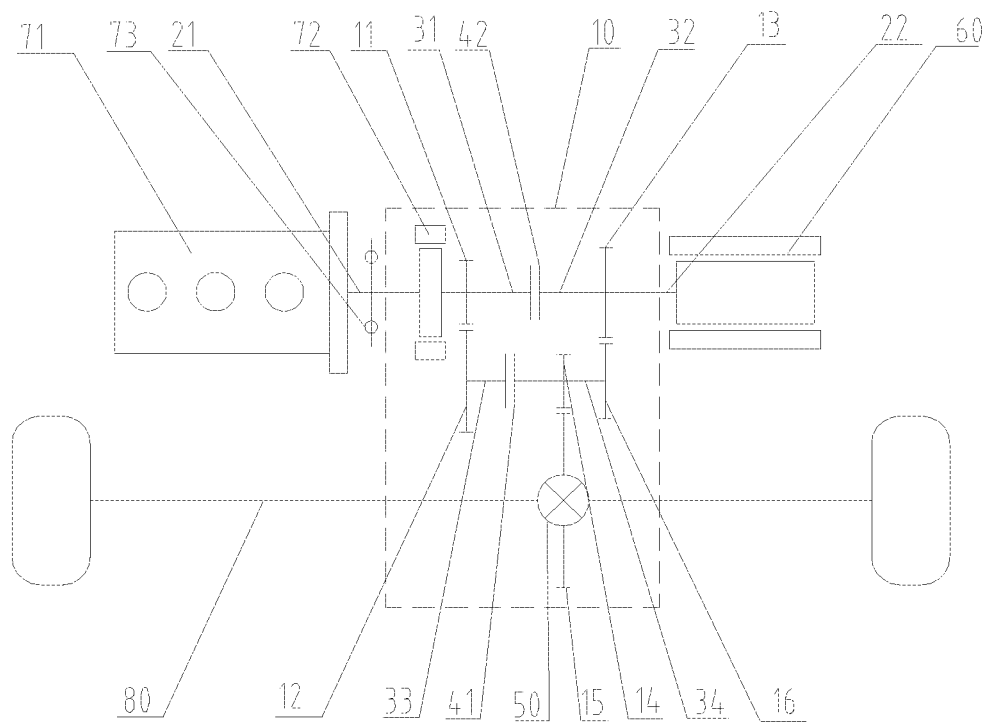
FIG. 2 is a schematic structural diagram of the vehicle drive assembly with transverse dual-power-source of the second embodiment of the present disclosure.

The second embodiment of the present disclosure is an improvement made on the basis of the first embodiment. The differences between the second embodiment and the first embodiment of the present disclosure are that, as shown in FIG. 2, the fourth intermediate shaft 34 is further provided with a sixth gear 16; the sixth gear 16 is in engaged transmission with the third gear 13 on the second intermediate shaft 32; and the fourth gear 14 is merely in engaged transmission with the fifth gear 15.

The engaged transmission ratio of the third gear 13 to the sixth gear 16 is set to i5;

when the first clutch 41 is engaged and the second clutch 42 is disengaged, an engaged transmission ratio in the automatic transmission is i1×i3; the first power source transmits power to the vehicle axle half shaft via sequentially the first input shaft 21, the first intermediate shaft 31, the first gear 11, the second gear 12, the third intermediate shaft 33, the first clutch 41, the fourth intermediate shaft 34, the fourth gear 14, the fifth gear 15 and the differential 50;

when the first clutch 41 is disengaged and the second clutch 42 is engaged, the first power source outputs power via the automatic transmission with an engaged transmission ratio of i5×i3; the first power source transmits power to the vehicle axle half shaft via sequentially the first input shaft 21, the first intermediate shaft 31, the second clutch 42, the second intermediate shaft 32, the third gear 13, the sixth gear 16, the fourth intermediate shaft 34, the fourth gear 14, the fifth gear 15 and the differential 50; and when both of the first clutch 41 and the second clutch 42 are disengaged, the second power source outputs power via the automatic transmission with an engaged transmission ratio of i5×i3. The second power source transmits power to the vehicle axle half shaft via sequentially the second input shaft 22, the second intermediate shaft 32, the third gear 13, the sixth gear 16, the fourth intermediate shaft 34, the fourth gear 14, the fifth gear 15 and the differential 50.

The different transmission ratios of the second embodiment are more flexible and under a less constraint. When larger transmission ratio are selected, the diameters of the gears are smaller, which can effectively reduce the radial dimension of the automatic transmission.

The other contents of the second embodiment of the present disclosure are the same as those of the first embodiment, and are not described repeatedly here.

The Third Embodiment

Figure 3:
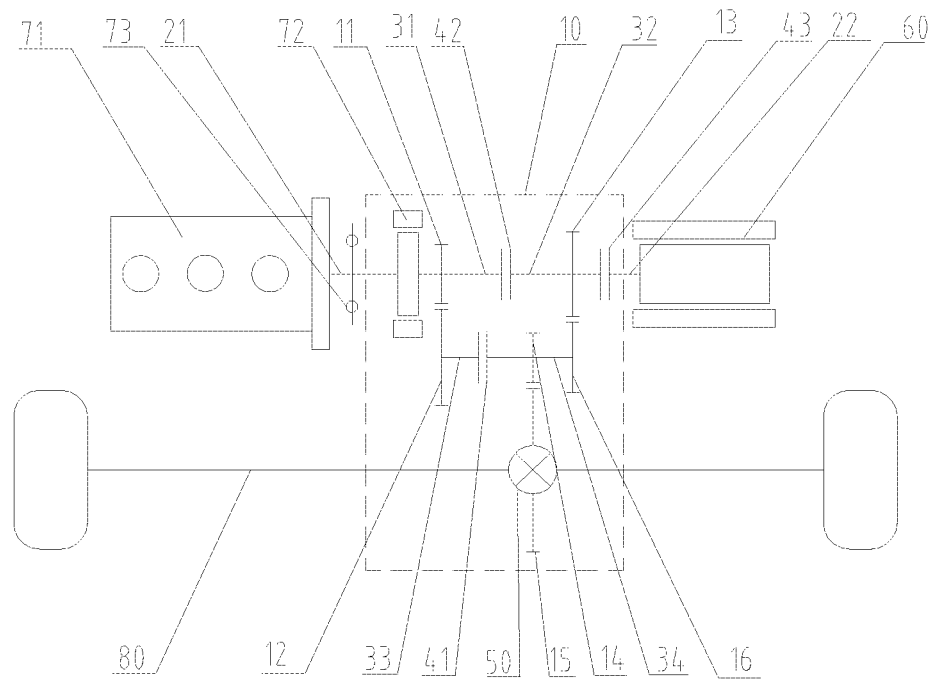
FIG. 3 is a schematic structural diagram of the vehicle drive assembly with transverse dual-power-source of the third embodiment of the present disclosure.

The third embodiment of the present disclosure is an improvement made on the basis of the second embodiment. The difference between the third embodiment and the second embodiment is that, as shown in FIG. 3, the second input shaft 22 and the second intermediate shaft 32 are two independent shafts, and a third clutch 43 is provided between the second input shaft 22 and the second intermediate shaft 32.

In the case that the second power source that is, the electric motor 60 serves as an auxiliary power source, when the second power source as the electric motor 60 is started up, the third clutch 43 is needed to be engaged; and when the second power source as the electric motor 60 is shut down, the third clutch 43 may be disengaged, at which point the electric motor 60 will not idle along with the operation of the entire vehicle, and the travelling of the entire vehicle is not restrained by the maximum rotational speed and the rotor rotational inertia of the electric motor 60.

The other contents of the third embodiment of the present disclosure are the same as those of the second embodiment, and are not described repeatedly here.

The Fourth Embodiment

Figure 4:
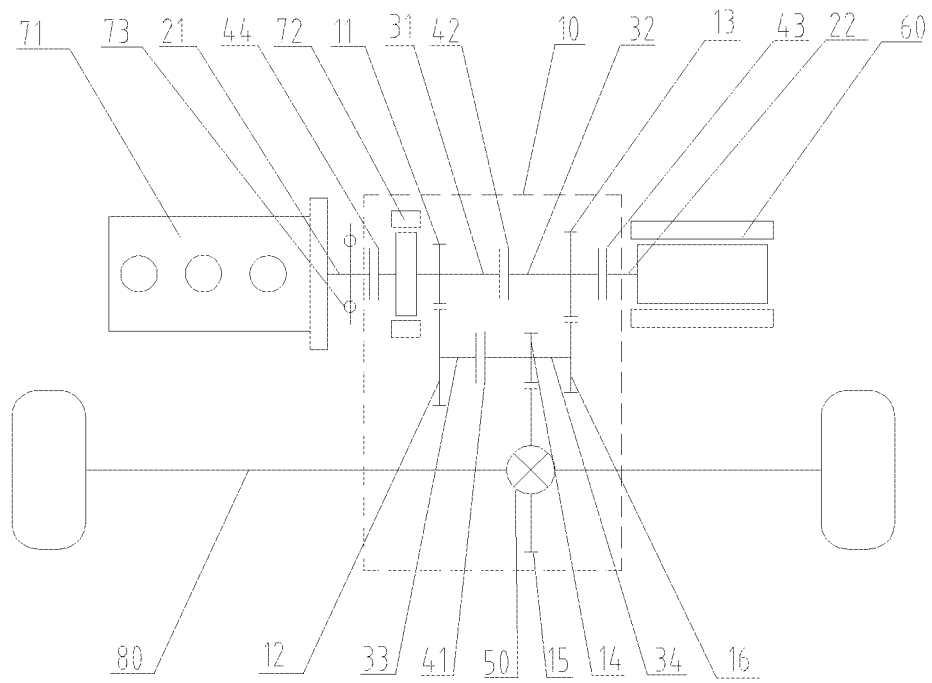
FIG. 4 is a schematic structural diagram of the vehicle drive assembly with transverse dual-power-source of the fourth embodiment of the present disclosure.

The fourth embodiment of the present disclosure is an improvement made on the basis of the third embodiment. The difference between the fourth embodiment and the third embodiment is that, as shown in FIG. 4, the first input shaft 21 and the first intermediate shaft 31 are two independent shafts, an engine is provided at the first input shaft 21, an ISG motor is provided at the first intermediate shaft 31, and a fourth clutch 44 is provided between the first input shaft 21 and the first intermediate shaft 31.

In the case that the first power source that is, the engine 71 serves as an auxiliary power source, when the engine 71 is started up, the fourth clutch 44 is needed to be engaged; and when the engine 71 is shut down, the fourth clutch 44 may be disengaged. When the engine 71 has been shut down, the ISG motor 72, as the electric motor, can still drive the first intermediate shaft 31 as the auxiliary power source, and at this point the ISG motor 72 is not restrained by the operating characteristics of the engine, and the performance of the ISG motor can be fully utilized.

The other contents of the fourth embodiment of the present disclosure are the same as those of the third embodiment, and are not described repeatedly here.

The Fifth Embodiment

Figure 5:
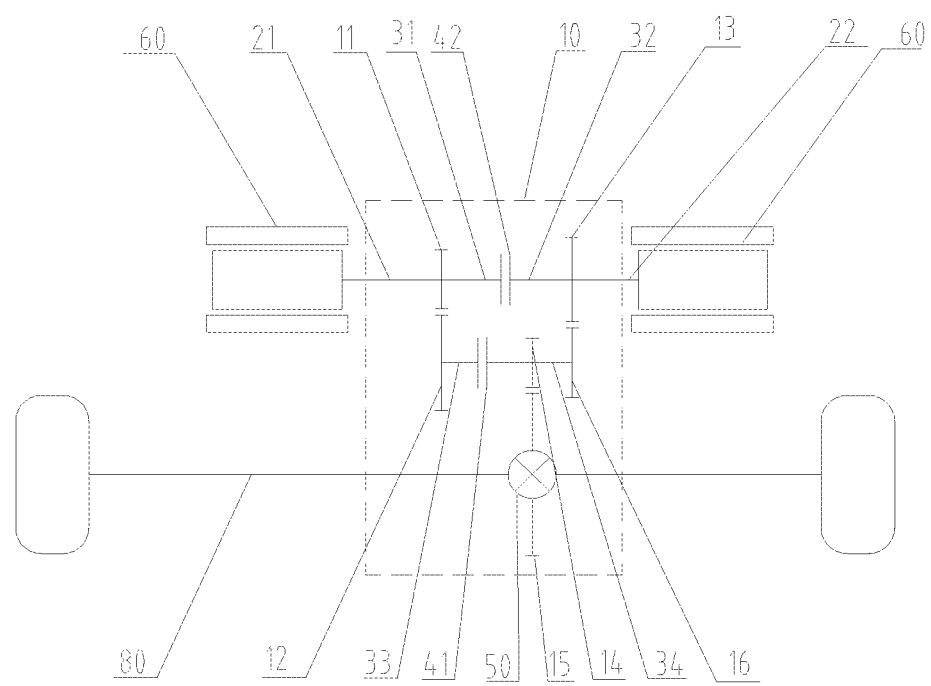
FIG. 5 is a schematic structural diagram of the vehicle drive assembly with transverse dual-power-source of the fifth embodiment of the present disclosure.

The fifth embodiment of the present disclosure is an improvement made on the basis of the second embodiment. The difference between the fifth embodiment and the second embodiment of the present disclosure is that, as shown in FIG. 5, in the fifth embodiment of the present disclosure, the first power source is the electric motor 60.

The other contents of the fifth embodiment of the present disclosure are the same as those of the second embodiment, and are not described repeatedly here.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

What is claimed is:

1. A vehicle drive assembly with transverse dual-power-source, connected to a vehicle axle half shaft, wherein the vehicle drive assembly comprises a first power source, a second power source and an automatic transmission, the automatic transmission is provided with a first input shaft and a second input shaft, the power sources are respectively connected to the two input shafts, and a differential is provided at a connection between the automatic transmission and the vehicle axle half shaft;

in the automatic transmission, a first intermediate shaft is provided coaxial with the first input shaft, and a second intermediate shaft is provided coaxial with the first intermediate shaft; the second input shaft is provided coaxial with the second intermediate shaft; and a third intermediate shaft is provided parallel to the first input shaft, and a fourth intermediate shaft is provided coaxial with the third intermediate shaft;

a first clutch is provided between the third intermediate shaft and the fourth intermediate shaft, and a second clutch is provided between the first intermediate shaft and the second intermediate shaft; and the first intermediate shaft is provided with a first gear, the third intermediate shaft is provided with a second gear, and the first gear and the second gear are in engaged transmission; the second intermediate shaft is provided with a third gear, the second intermediate shaft is provided with a fourth gear, and the third gear and the fourth gear are in engaged transmission; and the differential is provided with a fifth gear, the third gear and the fourth gear are in engaged transmission, and the fourth gear is simultaneously in engaged transmission with the fifth gear.

2. The vehicle drive assembly with transverse dual-power-source according to claim 1, wherein an engaged transmission ratio of the first gear to the second gear is i1, an engaged transmission ratio of the third gear to the fourth gear is i2, and an engaged transmission ratio of the fourth gear to the fifth gear is i3; and when the first clutch is engaged and the second clutch is disengaged, the first power source transmits power to the vehicle axle half shaft via sequentially the first input shaft, the first intermediate shaft, the first gear, the second gear, the third intermediate shaft, the first clutch, the fourth intermediate shaft, the fourth gear, the fifth gear and the differential; and an engaged transmission ratio in the automatic transmission is i1xi3.

3. The vehicle drive assembly with transverse dual-power-source according to claim 2, wherein when the second clutch is engaged and the first clutch is disengaged, the first power source transmits power to the vehicle axle half shaft via sequentially the first input shaft, the first intermediate shaft, the second clutch, the second intermediate shaft, the third gear, the fourth gear, the fifth gear and the differential; and in the automatic transmission the third gear, the fourth gear and the fifth gear are in engaged transmission with a transmission ratio of i4.

4. The vehicle drive assembly with transverse dual-power-source according to claim 2, wherein when both of the first clutch and the second clutch are disengaged, the second power source transmits power to the vehicle axle half shaft via sequentially the second input shaft, the second intermediate shaft, the third gear, the fourth gear, the fifth gear and the differential; and in the automatic transmission the third gear, the fourth gear and the fifth gear are in engaged transmission with a transmission ratio of i4.

5. The vehicle drive assembly with transverse dual-power-source according to claim 1, wherein the fourth intermediate shaft is further provided with a sixth gear; the sixth gear is in engaged transmission with the third gear on the second intermediate shaft; and the fourth gear is merely in engaged transmission with the fifth gear.

6. The vehicle drive assembly with transverse dual-power-source according to claim 5, wherein an engaged transmission ratio of the first gear to the second gear is i1, an engaged transmission ratio of the third gear to the fourth gear is i2, and an engaged transmission ratio of the fourth gear to the fifth gear is i3; and an engaged transmission ratio of the third gear to the sixth gear is i5;

when the first clutch is engaged and the second clutch is disengaged, an engaged transmission ratio in the automatic transmission is i1xi3;

when the first clutch is disengaged and the second clutch is engaged, the first power source outputs power via the automatic transmission with an engaged transmission ratio of i5xi3; and when both of the first clutch and the second clutch are disengaged, the second power source outputs power via the automatic transmission with an engaged transmission ratio of i5xi3.

7. The vehicle drive assembly with transverse dual-power-source according to claim 5, wherein the first power source is an electric motor or a combination of an engine and an ISG motor, and a torsion damper is provided between the engine and the ISG motor; and the second power source is an electric motor.

8. The vehicle drive assembly with transverse dual-power-source according to claim 5, wherein the second input shaft and the second intermediate shaft are integrated;

or, a third clutch is provided between the second input shaft and the second intermediate shaft.

9. The vehicle drive assembly with transverse dual-power-source according to claim 5, wherein the first input shaft and the first intermediate shaft are integrated;

or, a fourth clutch is provided between the first input shaft and the first intermediate shaft.

10. The vehicle drive assembly with transverse dual-power-source according to claim 5, wherein the vehicle axle half shaft is a front axle half shaft or a rear axle half shaft; and the first clutch, the second clutch, the third clutch and the fourth clutch each are a contrate tooth clutch.

11. The vehicle drive assembly with transverse dual-power-source according to claim 1, wherein the first power source is an electric motor or a combination of an engine and an ISG motor, and a torsion damper is provided between the engine and the ISG motor; and the second power source is an electric motor.

12. The vehicle drive assembly with transverse dual-power-source according to claim 1, wherein the second input shaft and the second intermediate shaft are integrated;

or, a third clutch is provided between the second input shaft and the second intermediate shaft.

13. The vehicle drive assembly with transverse dual-power-source according to claim 1, wherein the first input shaft and the first intermediate shaft are integrated;

or, a fourth clutch is provided between the first input shaft and the first intermediate shaft.

14. The vehicle drive assembly with transverse dual-power-source according to claim 1, wherein the vehicle axle half shaft is a front axle half shaft or a rear axle half shaft; and the first clutch, the second clutch, the third clutch and the fourth clutch each are a contrate tooth clutch.

* * * * *